US007265474B2

(12) United States Patent
Jeuck et al.

(10) Patent No.: US 7,265,474 B2
(45) Date of Patent: Sep. 4, 2007

(54) SPIRAL AND LEAF SPRING ARRANGEMENT FOR HOLDING AND APPLYING POWER TO A CARBON BRUSH

(75) Inventors: Günther Gregor Jeuck, Heuchelheim (DE); Wolfgang Käsdorf, Aarbergen (DE)

(73) Assignee: Schunk Kohlenstoff-Technik GmbH, Heuchelheim (DE)

( * ) Notice: Subject to any disclaimer, the term of this patent is extended or adjusted under 35 U.S.C. 154(b) by 327 days.

(21) Appl. No.: 11/142,684

(22) Filed: Jun. 2, 2005

(65) Prior Publication Data

US 2007/0001538 A1 Jan. 4, 2007

(30) Foreign Application Priority Data

Jun. 3, 2004 (DE) ...................... 10 2004 027 265
Sep. 9, 2004 (DE) .................. 20 2004 014 150 U

(51) Int. Cl.
*H02K 5/14* (2006.01)
*H01R 39/38* (2006.01)
*H01R 39/40* (2006.01)

(52) U.S. Cl. ...................................... 310/244; 310/239

(58) Field of Classification Search ......... 310/239–249
See application file for complete search history.

(56) References Cited

U.S. PATENT DOCUMENTS 1,794,291 A 2/1931 Hobart ....................... 310/241
1,966,057 A * 7/1934 Winkel ....................... 310/167
2,345,429 A 3/1944 Hanna ......................... 310/244
3,816,783 A 6/1974 Nakamura et al. .......... 310/246
4,085,346 A * 4/1978 Yoshida ....................... 310/246
4,238,703 A * 12/1980 Yoshida ....................... 310/242
4,638,203 A * 1/1987 Maki et al. ................. 310/239
5,227,950 A * 7/1993 Twerdochlib ............... 361/221
7,015,618 B2 * 3/2006 Kasdorf ....................... 310/239
7,045,928 B2 * 5/2006 Kasdorf ....................... 310/239
2007/0001538 A1 * 1/2007 Jeuck et al. ................ 310/244

FOREIGN PATENT DOCUMENTS

DE 312248 4/1919
DE 2421497 11/1974

* cited by examiner

*Primary Examiner*—Karl Tamai
*Assistant Examiner*—David W. Scheuermann
(74) *Attorney, Agent, or Firm*—Dennison, Schultz & MacDonald

(57) ABSTRACT

The invention relates to an arrangement for holding and/or guiding and applying power to a carbon brush (16, 18) in the direction of a current-transferring commutator (14) comprising a first spring element (20), which acts upon the side of the carbon brush facing away from the contact surface. To ensure that the carbon brush is supplied with the necessary pressure in the direction of the commutator, it is suggested that a second spring element (52, 56, 56), which supplies power to the carbon brush (16, 18) in the direction of the commutator (14), act upon the first spring element (20).

7 Claims, 4 Drawing Sheets

SPIRAL AND LEAF SPRING ARRANGEMENT FOR HOLDING AND APPLYING POWER TO A CARBON BRUSH

The invention relates to an arrangement for holding and/or guiding and applying power to a carbon brush in the direction of a current-transferring element such as a commutator or a collector ring comprising a leaf spring element as a first spring element, which acts upon the side of the carbon brush facing away from the contact surface and is connected to the carbon brush or a section connected thereto in a bonding manner.

A corresponding arrangement can be inferred from DE-A-102 07 406 (WO-A-03/071662). Here the carbon brush extends from an arched leaf spring element, which comprises a support section on which the carbon brush is supported and welded flush with its back.

Also according to DE-C-100 63 405 a carbon brush rests with its surface on a leaf spring section and is fixed by freely cut webs.

In the known arrangement, the leaf spring assumes multiple functions, i.e. a retaining and guiding function for the carbon brush as well as the necessary power application in the direction of a commutator or collector ring. Current is also transferred.

A carbon brush holder is known from DE-A-199 62 705, comprising a leaf spring with a support section equipped with an opening through which the carbon brush extends for fastening it through insulation displacement contact.

A holder for a carbon brush is known from U.S. Pat. No. 4,638,203 consisting of an L-shaped spring element, the one leg of which comprises a U-shaped dent, in which the carbon brush can be fixed.

An electric motor for small units according to DE-A-24 13 578 comprises holders for carbon brushes designed as leaf springs, which each comprise a prismatic extension that can be fixed in a section of the leaf spring through a notch effect.

Especially the generic arrangement has the advantage that little space is required, and current can be fed via the leaf spring without difficulty. However, it may have the disadvantage that due to the spring tension caused by the leaf spring, only a small wear and tear length is made possible. Due to the spring tension, the corresponding arrangements are in principle only used for brushes that have smaller cross-sections so that they are limited to systems using small motors with conventional power and usage.

Carbon holder arrangements are also known which have two spring elements with respect to one carbon brush. Here a force is created by the second spring element for allowing the carbon brush to rest against a commutator in the required extent. To adjust this force according to U.S. Pat. No. 1,794,291 the second spring can snap-fit into projections of the first spring element in order to generate different forces based on different leverage effects.

According to DE-C-312 248 a carbon brush holder is connected rotatably to a holder via a leaf spring. Torque is then applied by means of a coil spring in order to generate the required pressing force of the carbon brush in the direction of a commutator.

According to U.S. Pat. No. 3,816,783 a first spring element extends from one segment of a spiral spring causing a pressing force that is applied on a carbon brush.

In order to adjust a carbon brush in the direction of a commutator according to DE-A-2 421 497, the carbon brush extends from an arm that can swivel about an axis. In order to guarantee the required spring tension for pre-stressing the brush against the commutator, a coil spring applies pressure on the carbon brush.

According to. U.S. Pat. No. 2,345,429 the pressure of a spring element acting together with a carbon brush is generated by a spring, which acts upon the spring element.

The present invention is based on the object of further developing an arrangement of the afore-mentioned kind in such a way that it is guaranteed that the carbon brush always receives the necessary pressure in the direction of a current-transmitting element such as a commutator or collector ring in order to be able to use it in particular for engines with high power and for such requiring a long service life. According to another aspect of the invention, it is provided to take advantage of the benefits of the familiar leaf spring arrangement, which requires little space, offers good current transfer via the leaf spring and represents the fastening for the carbon brush itself, however, to create at the same time the possibility of achieving greater areas subject to wear than with the familiar arrangement and using the arrangement especially in motors with greater power. Consequently it should be ensured that first, for an accurate guidance of the carbon brush via, the first leaf spring element is enabled, and that at the same time it is guaranteed that via the leaf spring element the required pressing forces for contact against the commutator or a collector ring are available across the entire desired area subject to wear of the carbon brush.

This problem is basically solved in accordance with the invention in that a spiral spring applying power to the carbon brush in the direction of the current-conducting element acts upon the leaf spring element and acts as a second spring element, which rests with its surface against the outer surface of the first spring element facing away from the carbon brush.

Consequently, in accordance with the invention, the pressure generated by the leaf spring, which may possibly not suffice to ensure the pressing force required across the entire area subject to wear of the carbon brush in the direction of the current-movable element, is increased in that a spiral spring acts upon the first spring element. Here the leaf spring can be used to guide the carbon brush and additionally to act as a power lead.

It is also possible to have the second spring element extend from the section of the leaf spring that accommodates the carbon brush, wherein tractive forces act upon the leaf spring in the direction of the current-transferring element via said second spring element.

If the first and the second spring element should extend in sections in a common or nearly common plane, there is also the possibility that the planes created by the spring elements intersect at an angle of e.g. 90°, or roughly at 90°.

The leaf spring element has a support section supporting the carbon brush, wherein the carbon brush rests against it flush with its rear end face. On the support section, sections can be clear cut and bent out in order to accommodate the carbon brush in a guiding manner. Independently of this, the carbon brush is connected to the support section in a bonding manner. In order to achieve a sufficiently bonding connection between the carbon brush and the first spring element, it is provided in particular that the carbon brush comprises at its end facing away from the commutator or collector ring a layer designated as a weldable head.

The idea pursuant to the invention results in an arrangement, which ensures that spring tension prevails across an area subject to wear, which depending on the design of the spring is clearly greater than what can be achieved with a leaf spring. In this way, a greater area subject to wear is provided. At the same time power can be supplied via the first spring element, which also guides the carbon brush.

Due to the idea of the invention, the arrangement allows the use of carbon brushes with larger cross-sections and greater lengths. Hence the arrangement pursuant to the invention offers the possibility of applications in motor with high demands in terms of their service life. The advantages resulting from a small installation depth and inexpensive manufacture, however, are maintained.

Further details, advantages and features of the invention result not only from the claims. the features disclosed therein—either alone and/or in combination, but also from the following description of preferred embodiments to be inferred from the drawing, wherein:

BRIEF DESCRIPTION OF THE SEVERAL VIEWS OF THE DRAWINGS

FIG. 1 is a representative illustration of a universal motor 10, which is intended e.g. for machine tools or appliances that can be operated with power levels up to e.g. 2000 or 2500 W.

DETAILED DESCRIPTION OF THE INVENTION

Figure 3:
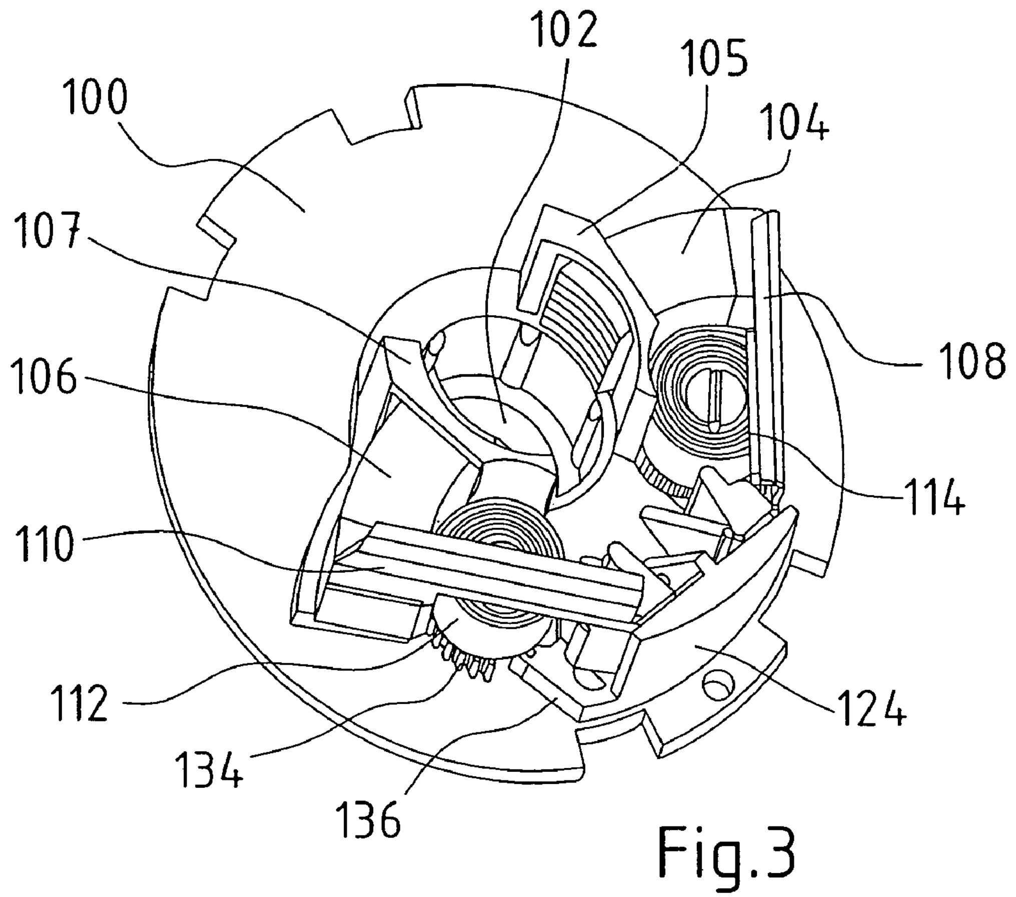
FIG. 3 is a perspective representation of a carbon brush support plate from above.
Figure 4:
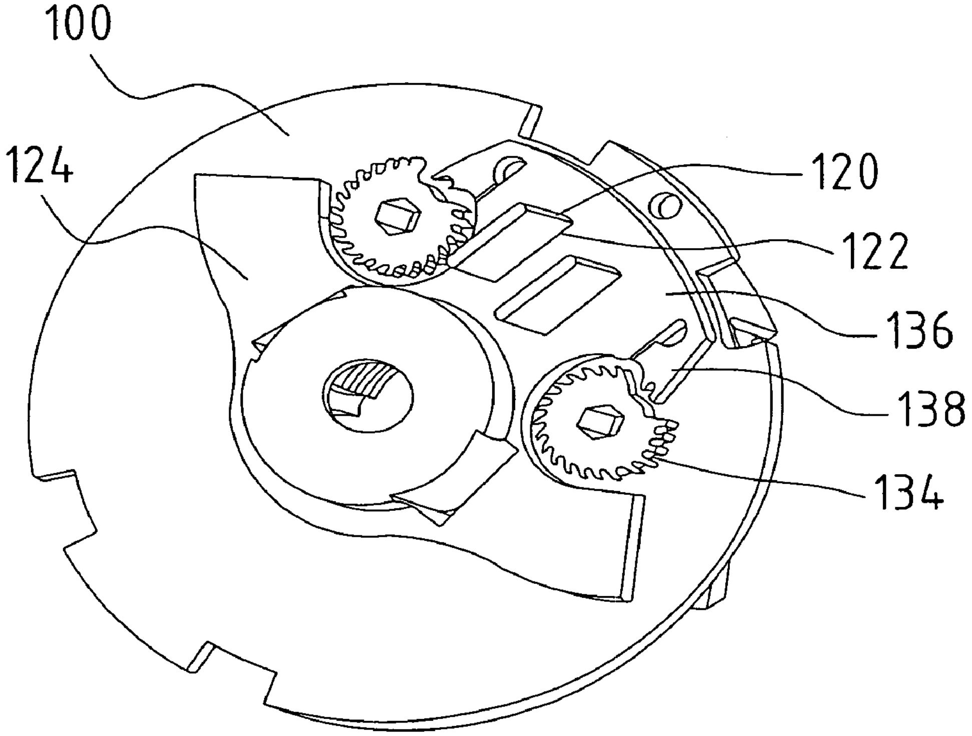
FIG. 4 is the carbon brush support plate from FIG. 3 from beneath.

The universal motor 10 comprises a housing 12 and an electric motor with commutator 14 arranged in said housing, against which the carbon brushes 16, 18 rest in a power-supplied manner for power transmission purposes. For this, the carbon brushes 16, 18 extend from a holder (which is illustrated in outline only in connection with the carbon brush 16) in the form of a leaf spring 20, the function of which is known, and which comprises a retaining segment or a retaining section 22, and a support section 24 that accommodates the carbon brush 16. The retaining section 22 can be fixed in the familiar manner between bearings and counter-bearings 26, 28, 30. For this purpose, the retaining section 22 in the exemplary embodiment contains a U-shaped section 32, which surrounds the bearing 28, while the adjoining sections rest with their surfaces against the counter-bearings 26, 30. This provides the holder 20 with clear fixation, wherein due to the pre-stress of the support section 24 in relation to the retaining section 22, the necessary power is applied—in the direction of the commutator 14—to the carbon brush 16 extending from the support section 24. There is, however, also the possibility of designing the retaining section 22 as plug contact, as FIGS. 3 and 4 show.

The carbon brush 16 rests with its rear surface 34, which runs opposite the contact surface 36 resting against the commutator 14, flush on the surface 38 of the support section 24 facing the commutator and can be fixed by means of outwardly bent tabs or lugs 42, 44 that are cut free from the support section 24 or its surface 38 creating a plane, wherein at least one tab or one lug 40, 42, 44, respectively, runs along the lateral surfaces 46, 58 of the carbon brush 16. In this way, the carbon brush 16 is held and guided as needed and if necessary fixed by means of clamps without leading to the insulation displacement accompanying a notch effect, as occurs pursuant to the state of the art.

Additionally or alternatively, the carbon brush 16 is fastened in a bonding manner with its rear surface 34 to the support section 24 or its surface 38 extending on the carbon brush side. For this, the carbon brush 16 can be soldered or welded onto the support section 38. If necessary, a section consisting of metal can be provided along the rear surface 34 of the carbon brush 16, which is bonded both with the carbon brush 16 and with the carrier 38.

The power lead to the carbon brush 16, 18 occurs via the leaf spring 20, which additionally serves as holder for the carbon brush 16 and hence guides it.

Since leaf springs in principle have a strongly path-dependent characteristic spring line, it must be ensured that the carbon brushes 16,18 (which can have lengths of e.g. 20 mm to 25 mm) rest against the commutator 14 across their entire area subject to wear with the required force. For this purpose, it is suggested that a second spring element should act upon the leaf spring 20 such that a basically constant spring tension can be achieved across the entire area subject to wear and/or that a spring tension can be generated that is sufficient to allow the carbon brush 16, 18 to rest against the commutator 14 across the entire area subject to wear with the necessary pressure.

Figure 1:
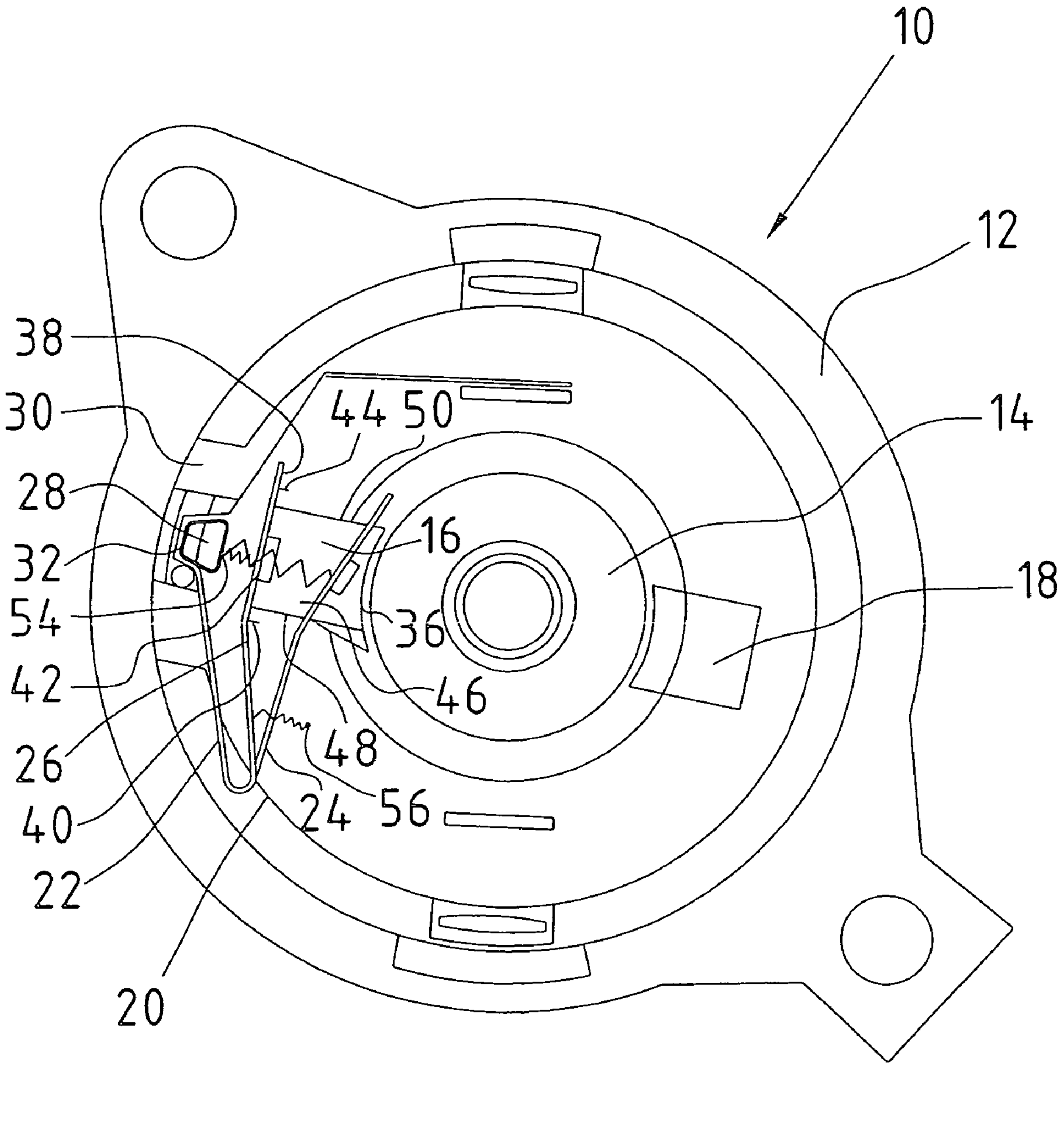
FIG. 1 is a basic representation of a carbon brush arranged in a motor.

As an additional spring a spiral spring is provided pursuant to the invention. FIG. 1 however shows alternatives hereto in order to explain the basic functions of the additional spring.

According to one alternative, it is provided that a helical compression spring 52 extends from the bearing 28, which acts upon the support section 24 of the leaf spring 20, in particular in the area in which the carbon brush 16 is fixed on the support section 24, specifically on the side of the support section facing away from the carbon brush. Here the helical compression spring 52 should extend such that it is intersected by the longitudinal axis of the carbon brush 16 or cut by a line that extends from the axis of rotation of the commutator 14 to the fastening point 54 of the helical compression spring 52.

Alternatively or additionally, a tension spring 56 can be provided, which extends from the motor mounting and is connected to the support section 24, as is revealed in principle in FIG. 1.

Figure 2:
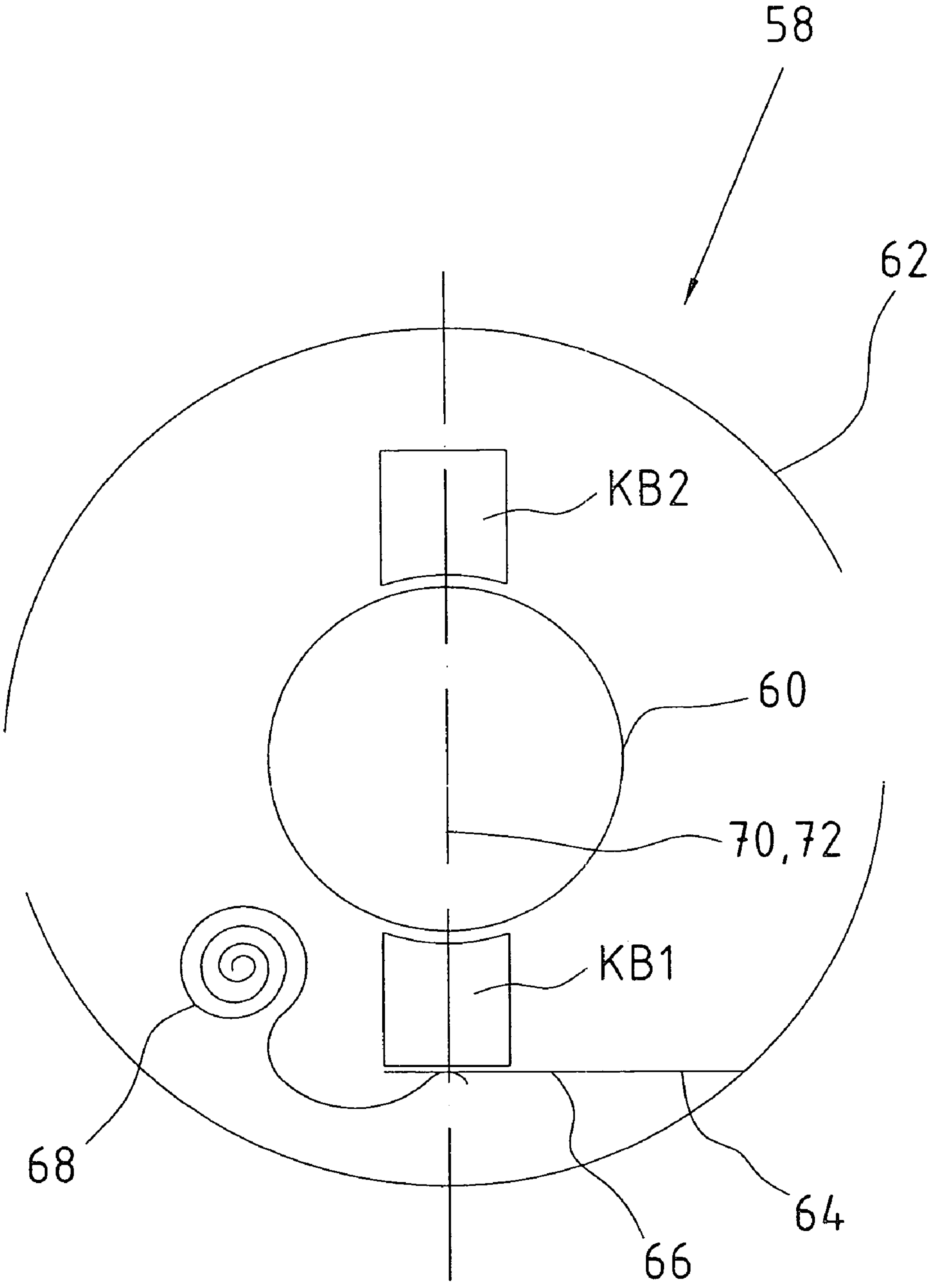
FIG. 2 is a basic representation of a second embodiment of a carbon brush arrangement.

FIG. 2 shows another representative illustration of an electric motor 58, especially in the form of a universal motor. Illustrated are the commutator 60, the motor housing 62 as well as carbon brushes KB1 and KB2. Here leaf springs 64 (only shown in connection with carbon brush KB1) act upon the carbon brushes KB1 and KB2 and apply power on the carbon brushes KB1, KB2 in the direction of the commutator 60. At the same time, leaf springs 64 serve as holders and guides for the carbon brushes KB1, KB2, as has been explained in connection with FIG. 1. The leaf springs 64 can also serve as power leads.

In order to ensure sufficient mounting force of the carbon brushes KB1 and KB2 on the commutator 60 across the area subject to wear of the carbon brushes KB1 and KB2, a spiral spring 68 rests against the outer surface 66 of the leaf spring 64 as the spring element. The spiral spring 68 and the leaf spring 64 extend in one plane, which runs perpendicular to the commutator longitudinal axis. Of course other arrangements are possible as well. The planes created by the spring elements can intersect each other at an angle, e.g. an angle of 90°. Other configurations are likewise feasible.

As FIG. 2 illustrates, the spiral spring 68 rests against the outer surface 68 of the leaf spring 64 in an area through which the longitudinal axis 70 of the carbon brush KB1 or a line 72 extends, which originates from the axis of the commutator 60.

Since the leaf spring 64 acts upon the second spring 68, it is ensured that the carbon brushes KB1, KB2 rests on the commutator 60 across their area subject to wear with the necessary pressure so that consequently relatively long carbon brushes KB1 and KB2 can also be used, i.e. such that are typically used in universal motors and have lengths of preferably up to 20 mm or 25 mm, without limiting the invention hereby.

FIGS. 3 and 4 show representative illustrations of a top view and a bottom view of a carbon brush support plate 100, which has a plate-shaped geometry. From the support plate 100 a carrier 124 consisting of electrically insulating material such as plastic comprising a central opening 102 extends, wherein a not illustrated commutator, to which carbon brushes 104, 106 are applied with power, extends through said opening. In order to ensure for one the necessary power supply across the entire area subject to wear of the carbon brush 104, 106 and secondly to securely guide the carbon brush 104, 106, pursuant to the invention a spring system is provided, which consists of a combination of a leaf spring 108, 110 as well as a spiral spring 112, 114.

Figure 5:
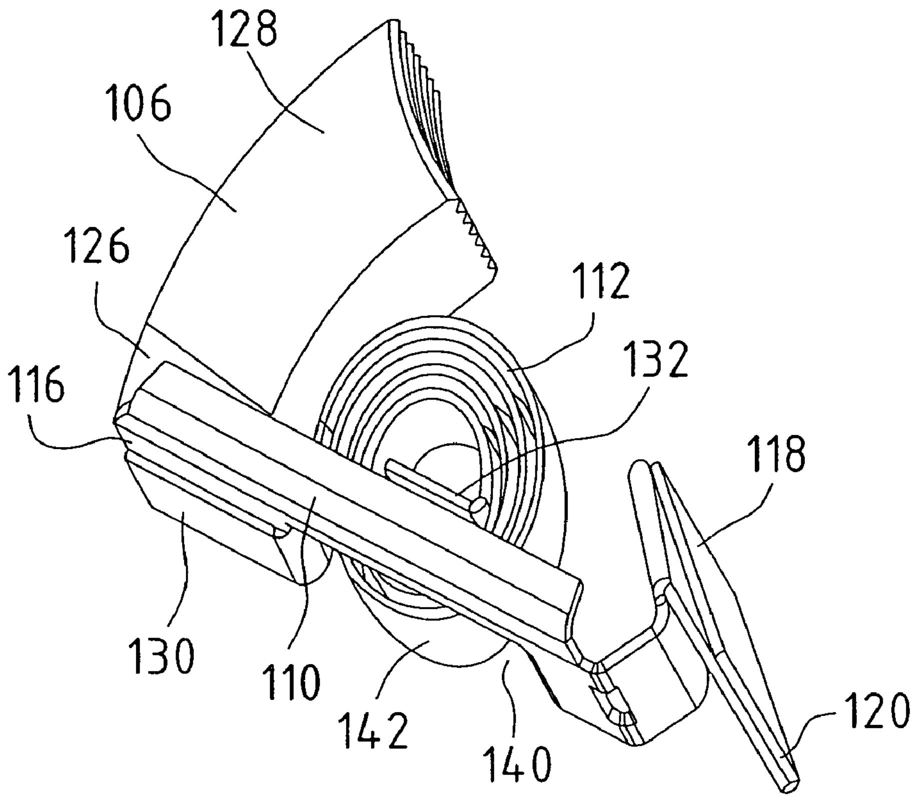
FIG. 5 is an enlarged representation of a carbon brush with a spring system.
Figure 6:
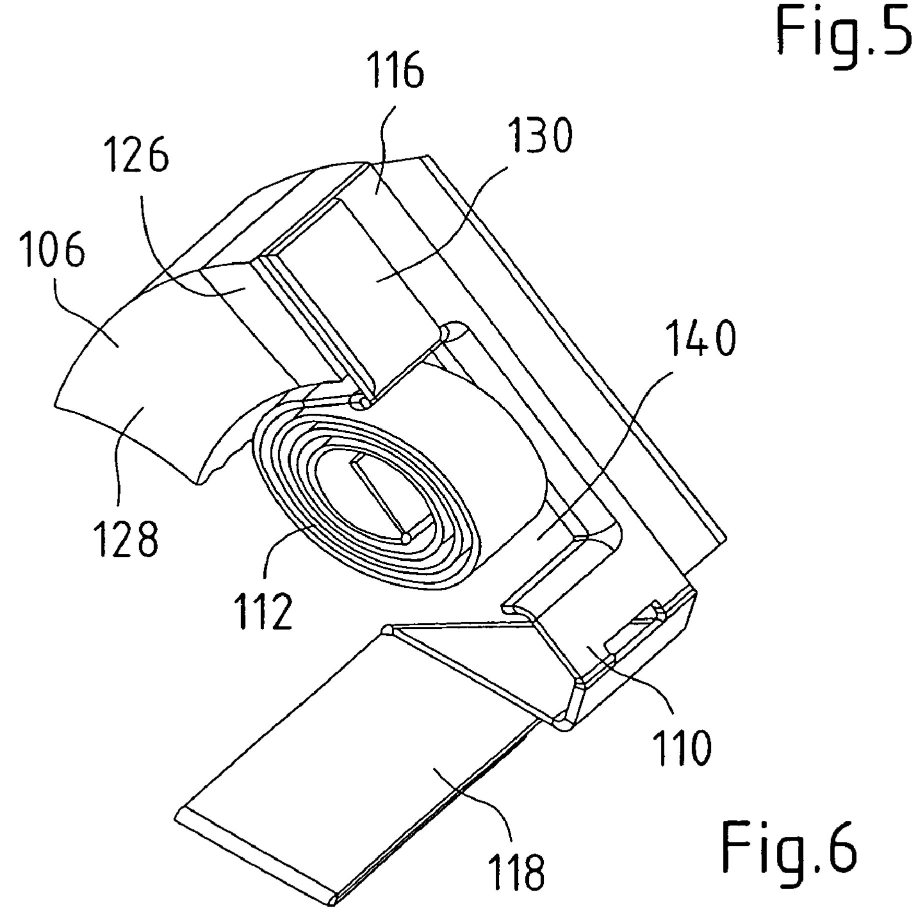
FIG. 6 is a bottom view of the arrangement from FIG. 5.

FIGS. 5 and 6 illustrate leaf spring 110 with carbon brush 106 as well as spiral spring 112 in two views. The leaf spring consists of a support section 116 and a retaining section 118 that is angled thereto and designed as a plug contact, via which power is fed to the carbon brush 106, hence also via the leaf spring 110. The retaining section 118 extends with an end section 120 through the slotted openings 112 of the carrier 124, which is connected to the carbon brush support plate 100.

The support section 116 of the leaf spring 110 is connected with the carbon brush 106 in a bonding manner, especially by means of welding. For this the carbon brush 106 comprises a section 126 on the rear, which consists of metal or another material suitable for welding, which is in turn connected in a bonded fashion to the carbon brush 106, i.e. the front section 128, which becomes worn during operation.

The spiral spring 112 extends with an end section 130 along the outside of the support section 116 and can be connected to it preferably by means of welding. The power required for having the carbon brush 128 rest against the power-transferring element, such as a commutator or collector ring, is accordingly supplied via the spiral spring 112 to the leaf spring 110 and hence to the carbon brush 106.

In order to be able to stress the spiral spring 112 as needed, its inner end 132 extends from a rotatable snap-fit element 134, which is pivoted in the carbon brush support plate 100. A section 136 of the carrier 124 extending along the carbon brush support plate 100 comprises a section forming a snap bracket 138, which interacts with a disk-shaped snap-fit element 134 comprising protrusions such that the spiral spring 112 is subjected to the necessary pre-stress by rotating the snap-fit element 134 and interacting with the snap bracket 138.

In order to ensure a constant position of the carbon brush 104, 106 on the commutator, which is not shown, the carbon brush 106, 104 has an arched shape with a radius, which is adapted to the bending radius of the leaf spring 108, 110. In other words, the bending radius of the carbon brush 104, 106 roughly extends from the center of gravity of the leaf spring 108, 110.

Like the leaf springs 108, 110, guides 105, 107 for the carbon brushes 104, 106 extend from the carrier 124, which preferably consists of plastic. The spiral springs 112, 114 are likewise seated in an electrically insulated fashion in relation to the brush support plate 100.

The explanations provided in connection with carbon brush 106 and leaf spring 110 as well as spiral spring 112 apply accordingly to carbon brush 104 and the elements connected thereto and/or interacting therewith.

Another feature enabling a compact configuration is revealed in FIGS. 3 to 5. The support section 116 of the leaf spring 108, 110 comprises an opening 140 between the carbon brush 106 and the retaining section 118, with the spiral-wound area 142 of the spiral spring 112, 114 extending in sections within said opening. The section 114 hereby has such a height that during the course of wear of the carbon brush 106, 108 the leaf spring 108, 110 can travel with its retaining section 116 across the spiral spring 112, 114, i.e. the area 142, without impairment.

If the leaf spring 112, 114 is preferably welded to the rear of the retaining section 116 of the leaf spring 108, 110, this does not represent a mandatory feature. Other connecting possibilities are likewise possible. The leaf spring 112, 114 can also rest against the outside of the leaf spring 108, 110 without separate connection.

For assembly, the spiral spring 112, 114 can be mounted without pre-stressing together with the leaf spring 108, 110 and the carbon brush 104, 106 so as then to adjust the required pre-tension by rotating the disk-shaped snap-fit element 134. If the inner end 132 of the snap-fit element 134 holding the spiral spring 112, 114 is rotated, the snap bracket 138 engages in accordance with the position of the snap-fit element 134, thus locking the configuration and pre-stressing the spiral spring 112, 114.

The idea pursuant to the invention makes it possible to guide the carbon brushes 104, 106 securely and easily across the leaf spring 108, 110 while simultaneously transmitting current via it. This leads to low transition resistance. At the same time it has the advantage that the carbon brush rests on a commutator or a collector ring or a similarly acting element across the desired area subject to wear with the necessary pressure since a second spring element in the form of a spiral spring 112, 114 additionally acts upon the leaf springs 108, 110, which can be tensioned easily, so that consequently also desired pressing forces can be adjusted. Due to the bonding connection of leaf spring 108, 110 to carbon brush 104, 106, a clear position of the latter is guaranteed.

Assembly can be facilitated in that the spiral spring 112, 114 is mounted with the leaf spring 108, 110 and the carbon brush 104, 106 to the carrier 100 in the non-stressed state. Due to the bent geometry of the carbon brushes 104, 106, a constant position of the contact surface of the carbon brush 104, 106 on the commutator or collector ring is guaranteed.

The invention claimed is:

1. Arrangement for holding and/or guiding and applying power to a carbon brush (16, 18, KB1, KB2, 104, 106) in the direction of a current-transferring element, such as a commutator (14, 60) or a collector ring comprising a leaf spring element (20, 60, 108, 110) as a first spring element, which acts upon the side of the carbon brush facing away from the contact surface and is connected to the carbon brush or a section (126) extending therefrom in a bonding manner, characterized in that a second spring element (52, 56, 68, 112, 114) in the form of a spiral spring element, which supplies power to the carbon brush (16, 18, KB1, KB2, 104, 106) in the direction of the current-transferring element (14, 60), acts upon the leaf spring (20, 60, 108, 110), wherein the second element rests against the side of the leaf spring element (20, 64, 108, 110) facing away from the carbon brush at least in sections.

2. Arrangement according to claim 1, characterized in that the spiral spring element (52, 68) rests against the leaf spring element in one area of the leaf spring element (20, 64) in which the carbon brush (16, 18, KB1, KB2, 104, 106) is connected to the leaf spring element in a bonding fashion.

3. Arrangement according to claim 1, characterized in that the first and the second spring elements (20, 52, 56, 68; 108, 110, 112, 114) extend with one section, respectively, in or nearly in one common plane in which the spring elements are connected to each other.

4. Arrangement according to claim 1, characterized in that the spiral spring element (112, 114) extends with its inner end (132) from a rotating holder, which is designed as a disk-shaped snap-fit element (134).

5. Arrangement according to claim 4, characterized in that the snap-fit element (134) comprises projections in its circumference, which for the purpose of tensioning the spiral spring element (112, 114) interact with a snap bracket (138), which is a section of a carrier (136) consisting of insulating material in which the leaf spring element (108, 110) is fixed with a retaining section (118) configured as a plug.

6. Arrangement according to claim 1, characterized in that the carbon brush (104, 106) extends from a support section (116) of the leaf spring (108, 110), which comprises an opening such as a section (140) through which the spiral spring element (112, 114) extends.

7. Arrangement according to claim 1, characterized in that the spiral spring element (112, 114) is welded to the support section (116) of the leaf spring element (108, 110).

* * * * *